Dec. 30, 1958     S. S. McINTYRE, SR     2,866,621
ONE CABLE AND CLAMP SYSTEM OF GUYING
Filed Dec. 12, 1955     3 Sheets-Sheet 1
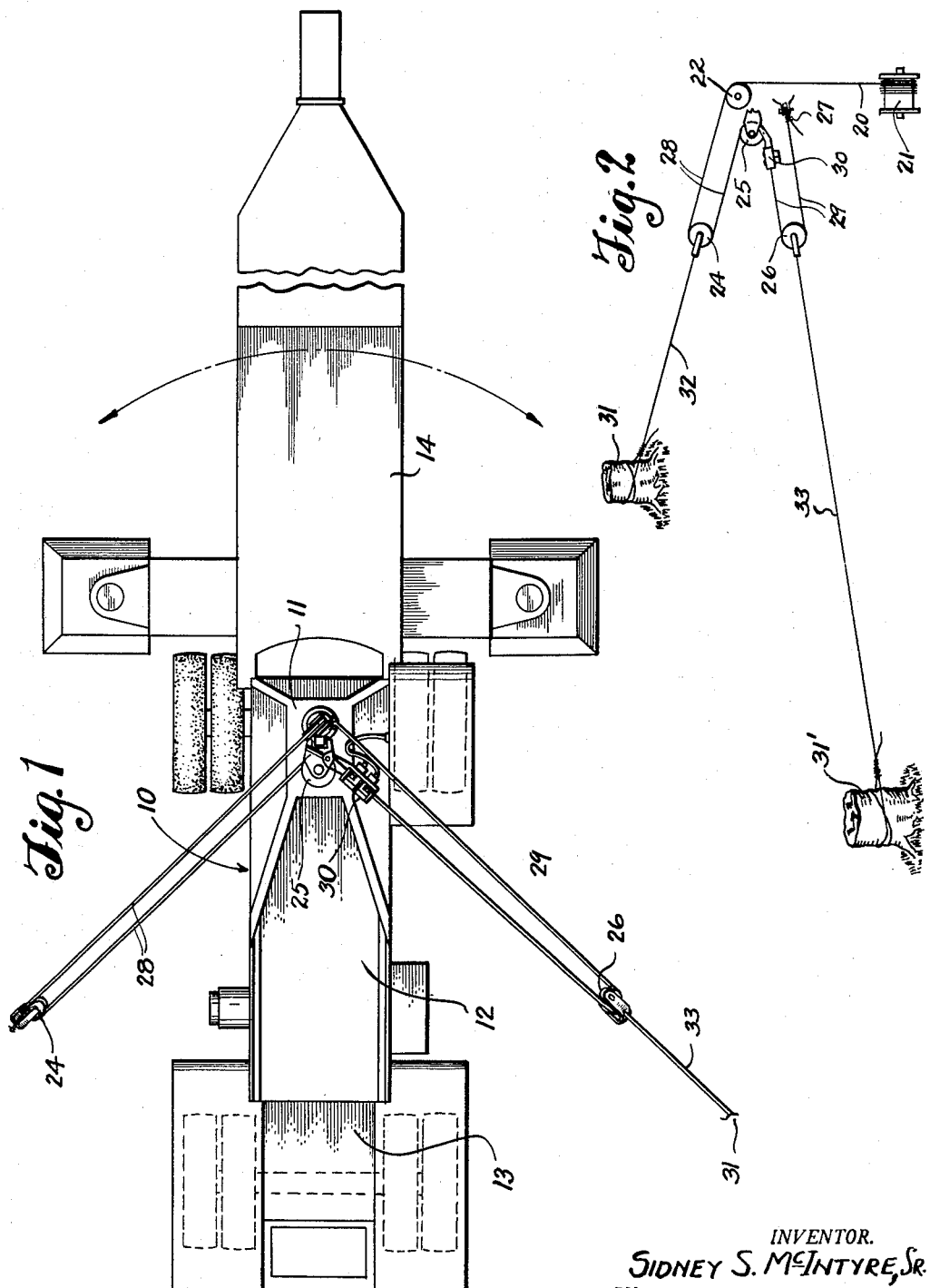
INVENTOR.
SIDNEY S. McINTYRE, SR.
BY
ATTORNEYS Dec. 30, 1958   S. S. McINTYRE, SR   2,866,621
ONE CABLE AND CLAMP SYSTEM OF GUYING
Filed Dec. 12, 1955   3 Sheets-Sheet 2

INVENTOR.
SIDNEY S. McINTYRE, SR
BY
Cook & Robinson
ATTORNEYS

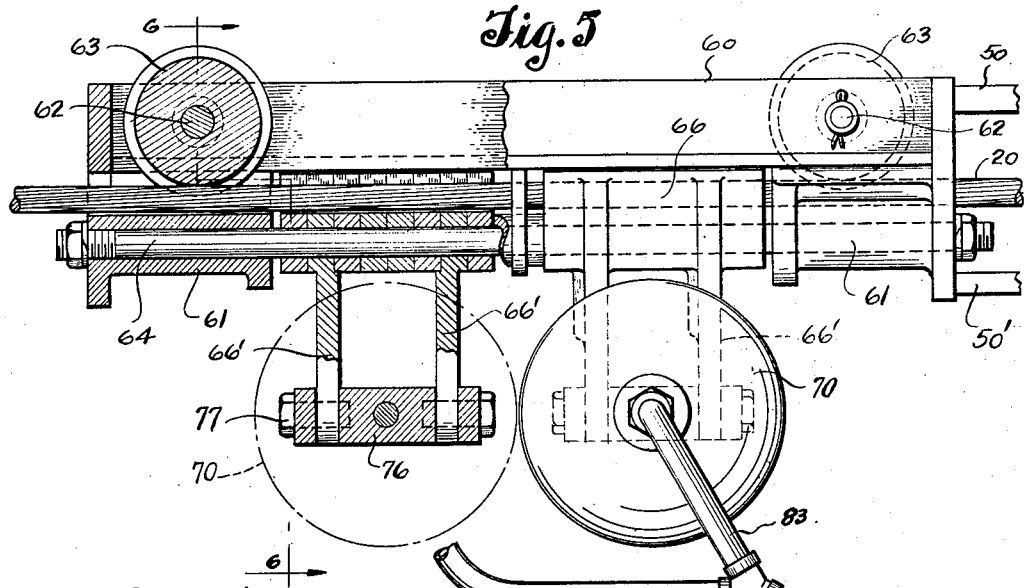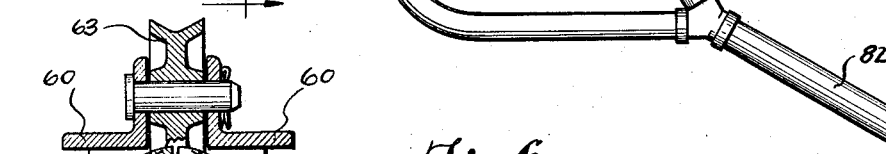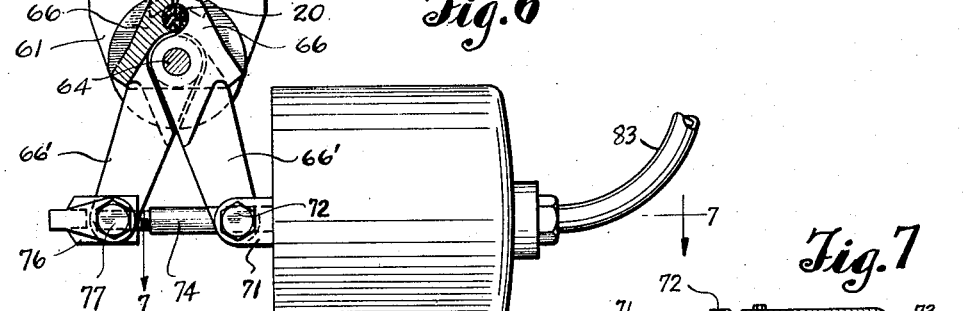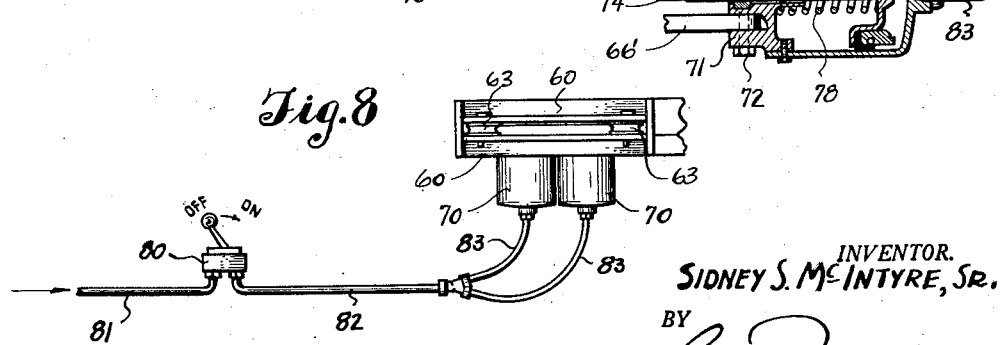

United States Patent Office 2,866,621
Patented Dec. 30, 1958

2,866,621

ONE CABLE AND CLAMP SYSTEM OF GUYING

Sidney S. McIntyre, Sr., Sedro Woolley, Wash., assignor to The Humboldt Company, Seattle, Wash., a corporation of Washington Application December 12, 1955, Serial No. 552,373

7 Claims. (Cl. 254—150)

This invention relates to a one cable system of guying and it has reference more particularly to a cable and cable clamp combination to be used, as for example, with means for guying the mast or tower of a logging vehicle.

It is the primary object of this invention to provide an improved tower guying cable system for a logging vehicle, wherein a single, continuous cable, wound on and extended from a cable winding drum mounted on the vehicle and dead ended on the mast, is so extended as to provide two guys angularly diverging from the upper end of the mast, to anchoring means at opposite sides of the vehicle, and wherein a cable clamp of novel kind is arranged for gripping the cable at a point where it diverges to provide the two guys, thus to retain the constancy of both guys after their lengths have once been established.

It is a further object of the invention to provide a cable clamp of novel kind for use in a guying system of the above character that is affixed to a sheave wheel over which the continuous cable extends in forming the two diverging guy lines, and which clamp, when set against the cable, will retain the diverging guys against any change in length which otherwise might result by reason of the cable, which is common to both of them, being able to run freely over said sheave.

Still further objects and advantages of the invention reside in the arrangement, relationship and combination of parts of the system, and in the mode of operation of the system as will hereinafter be fully described.

In accomplishing the above mentioned and other objects of the invention, I have provided the improved details of construction, the preferred forms of which are illustrated in the accompanying drawings, wherein:

Fig. 1 is a plan view of a logging vehicle with its mast guyed by laterally diverging guys as provided by the present one cable and clamp combination embodying the present system.

Fig. 2 is a view diagrammatically illustrating the formation of the two guying cables from the single cable and the place of use of the cable clamp.

Fig. 5 is a side view, and partial longitudinal section of the cable clamp.

Fig. 6 is a cross-section taken on line 6—6 in Fig. 5.

Fig. 7 is a cross-section, on line 7—7 in Fig. 6, of one of the air cylinders.

Fig. 8 is a diagram of the air cylinder control system.

Figure 3:
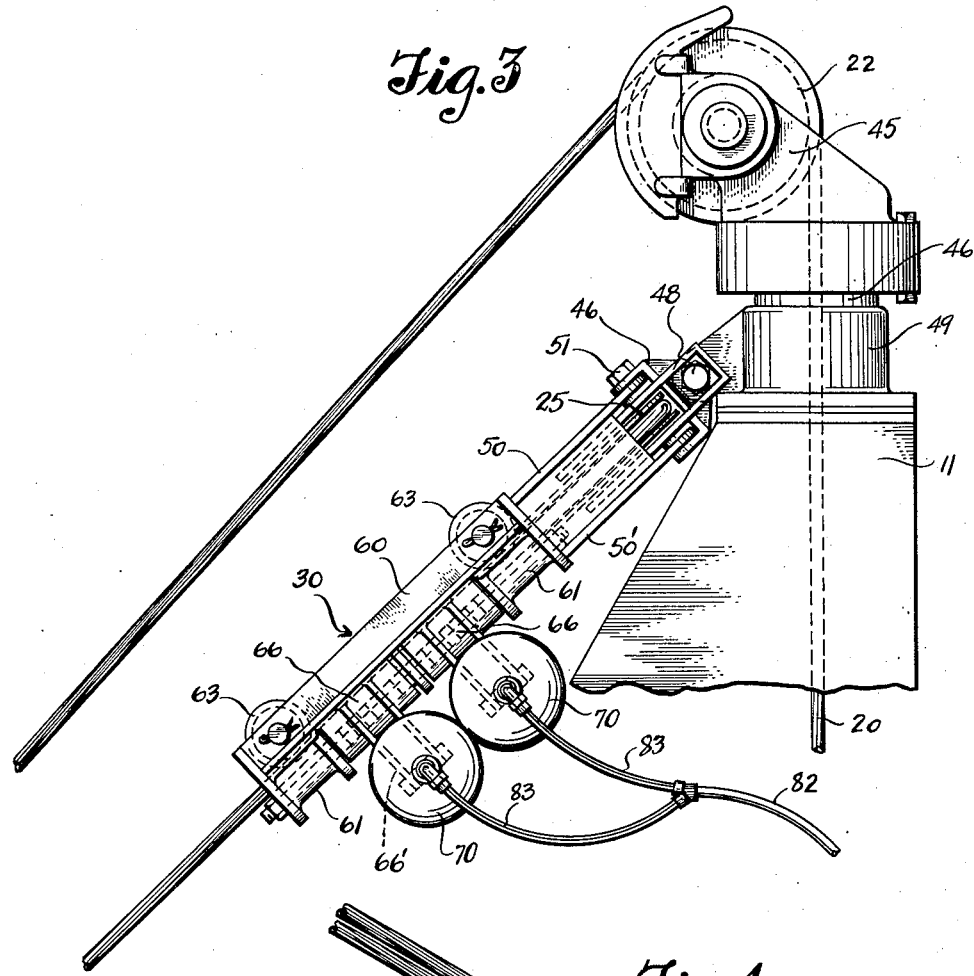
Fig. 3 is an enlarged side view of the cable guiding sheaves and blocks, and cable clamp, which are mounted at the upper end of the mast and which are embodied in the present system of guying.

Referring more in detail to the drawings:

To illustrate the mode of use of the present guying system, I have shown, in Fig. 1, a typical, present day type of mobilized logging truck designated in its entirety by reference numeral 10; this being a logging vehicle of the character of that shown in my pending application entitled "Swivel Jib" filed on July 14, 1955, under Serial No. 522,091. This vehicle is equipped with a mast or tower 11 erected upon a turntable structure 12 that is rotatably mounted on the wheel equipped chassis 13 of the truck. In using this vehicle, as for a log yarding or loading operation, it is first properly positioned and then guyed by the extending of guy lines from the tower top, generally in angular divergence as shown, and to opposite sides of the vehicle. In the present instance the vehicle is shown to be equipped with a log loading boom 14 which extends rearwardly and upwardly from the turntable structure. The guying is intended to resist whatever tendency there may be to cause the vehicle to tip under the boom load.

Heretofore, it has been customary in the guying of handling vehicle of this kind, to extend individual guy lines upwardly from cable winding drums on the turntable, over sheave wheels at the upper end of the mast, and then to extend them in angular divergence in the most practical directions for the work at hand, and to attach them to stumps, trees, or other suitable anchoring means. The present system of guying differs from that previously used and above mentioned in that it employs only a single, continuous cable to form both the guys. The guying cable, designated in Fig. 2 by numeral 20, is extended from a cable winding drum 21 which is mounted on the turntable, upwardly and over a guiding sheave 22 on a swivel mounting at that top of the mast 11, thence toward a guy anchoring means, which in Fig. 1 is shown to be forwardly and laterally of the mast. At its outer end this guy passes about an anchored sheave 24, and back to the top of the mast, over a sheave 25 that is attached to the mast, thence angularly relative to the first guy, and about an anchored sheave 26 from which it returns to the upper end of the mast and is there dead ended by suitable means, indicated at 27. By this arrangement of the continuous cable and its guiding and supporting sheaves, guys designated in Figs. 1 and 2 at 28 and 29, are provided.

It can be understood that by the paying out or the winding in of the cable 20 on the drum 21 both guys under normal conditions will be lengthened or shortened. However, under an unbalanced load that would cause or tend to cause the vehicle to tip to one side or the other, the cable may run freely over the intermediate sheave 25 and thus allow one guy to lengthen and the other to shorten, thus nullifying the function of the two guying lines. It has been to avoid this undesirable result that the present cable clamp, presently to be described in detail, has been employed.

It is shown diagrammatically in Fig. 2 that the sheaves 24 and 26, at the outer ends of the guys 28 and 29, and about which the cable 20 extends, are attached to anchoring stumps 31—31' by means of lines 32 and 33. It is generally provided that these lines may be adjusted in length to establish or change the effective lengths of the guy lines 28—29 after the clamp has once been set. However, the guy anchoring means may be anything which is suitable.

It is the intent that the log loading boom be supported at its outer end by a cable extended thereto over a sheave carried at the upper end of the mast. However, since that has no part of the present invention, it is not herein shown.

It is shown in Fig. 3 that the sheave wheel 22, over which the continuous cable 20 extends, is mounted to rotate on a horizontal axis carried in a swivel block 45 that turns on a tubular vertical axis 46. Also, it is to be observed in Fig. 4, that the sheave 25 is mounted for rotation on a pivot axis 25x mounted in a block 47 that has a horizontal hinge pin connection 48 with a collar 49 rotatable on the tubular axis 46, thus permitting the block to move and adjust itself to the slope and direction of the guys as they extend therefrom to the anchoring points.

Figure 4:
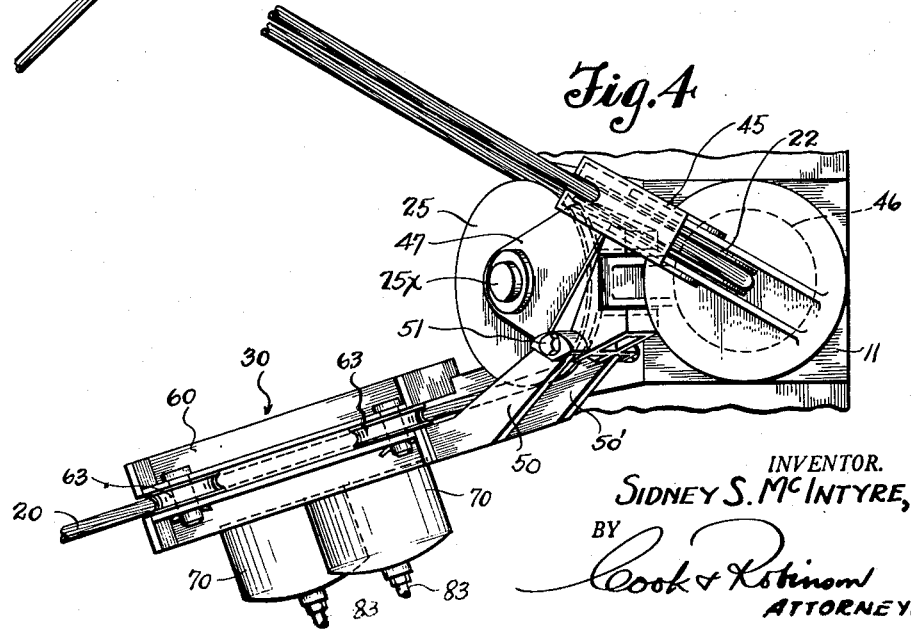
Fig. 4 is an upper or top view of the parts shown in Fig. 3, particularly illustrating the sheave used at the upper end of the mast to support the guying cable as it leads to the diverging guy lines, and the attachment of the cable clamp to the sheave block.

The cable clamping device, which is designated in its entirety by numeral 30, extends along the cable 20 at one side of the sheave wheel 25 as seen in Figs. 3 and 4. It comprises an elongated frame structure equipped with spaced supporting arms 50—50' extended from one end thereof. These two arms overlap with and are pivotally anchored at their outer ends by a pivot bolt 51 to the opposite face plates of the sheave wheel block 47. Thus, the clamp frame can adjust itself to the direction of the cable as it leads from the sheave 25.

The clamp frame structure comprises two parallel angle bars 60—60, joined rigidly in spaced relationship as best shown in Fig. 5, by yokes 61—61 at the undersides of the opposite end portions. Mounted between the angle bars, at opposite ends of the frame, on axles 62—62 are flanged wheels 63—63 adapted to ride upon the cable 20 as seen in Figs. 4 and 5. Supported by a hinge bolt 64 that extends lengthwise of the clamp, beneath the spaced bars 60—60 and through the opposite end yokes 61 as shown in Fig. 4, are two pairs of cable gripping jaws 66—66, each pair having jaw portions that are adapted to be opened apart for free running of the cable between them or to be closed against the cable to hold it against endwise travel. It is shown in Fig. 5 that the pairs of jaws are mounted on the hinge bolt 64, respectively, just within the opposite end yokes.

The jaws 66—66 have downwardly directed actuating levers 66'—66' fixed thereto, and each pair of levers is controlled by an air cylinder 70 for the opening or clamping of the clamp jaws. Each of the air cylinders 70 is closed at its opposite ends as shown in Fig. 7 and on one end has lugs 71 to which the levers of one set of jaws are pivotally attached by pivot pins 72. Also, the cylinder contains a piston 73 with piston rod 74 extended from the cylinder, and attached at its end to a cross-bar 76 to which the companion jaw levers 66' are pivotally attached by pivot bolts 77. Normally the jaws are held in open position by spring means 78 within the air cylinder so that the cable can run freely between them.

Opening and closing of the jaws is controlled by the manipulation of a valve 80, as shown in Fig. 8, whereby air under pressure is admitted to or exhausted from the cylinders. In Fig. 8, 81 designates a supply line from a source of air under pressure. This leads to valve 80 and from this a line 82 leads to branch lines 83—83 which connect, respectively, with the outer ends of the cylinders 70—70 as shown. Under the pressure of air in the two cylinders, the jaws will grip the cable 20 to hold it against any longitudinal movement. In this way, the lengths of the two guys are held constant.

Having thus described my invention, what I claim as new therein and desire to secure by Letters Patent is:

1. A guying system for a mast or the like comprising a block close coupled to the guyed end of the mast, cable winding means secured relative to the mast, two guy line anchoring blocks fixed at locations away from the mast on lines that radiate therefrom in substantial angular divergence, and a continuous guying cable fixed at one end to the mast and extended therefrom to and through one of said anchoring blocks, thence back to and through the first mentioned block, thence away from said first mentioned block and mast to and through the other of said anchoring blocks, thence back to said mast and to said cable winding means secured relative thereto, and a means closely associated with the first mentioned block and adapted to be holdingly engaged with the cable to prevent any reeving movement thereof through said first mentioned block.

2. A guying system for a mast comprising a sheave fixed to the guyed end of said mast, a cable guiding sheave wheel at the upper end of the mast, two guy line anchoring sheaves fixed at locations away from the mast on lines radiating therefrom in substantial angular divergence, a cable winding means, a continuous guying cable extended therefrom, over said cable guiding sheave wheel, thence away from the mast to and through one of said anchoring sheaves, thence back to the mast and through the first mentioned sheave, thence away from the mast to and through the other of said anchoring sheaves, thence back to the mast and dead ended thereto; said cable being placed and held under guying tension by said cable-winding means; and a cable clamp fixed to the first mentioned sheave in close relationship thereto and adapted to be engaged with the cable at that location to prevent any reeving travel thereof through said first mentioned sheave.

3. The guying system of claim 2 wherein said cable clamp comprises paired jaws between which the cable passes and is free to travel when the jaws are opened, and a power operated means is operatively connected with said jaws for closing them against the cable.

4. The combination recited in claim 2 wherein said cable clamp comprises a frame structure with paired levers hingedly mounted therein provided at their inner ends with opposedly related jaws between which said cable freely passes when the jaws are opened, and wherein the means for opening and closing said jaws comprises a fluid pressure medium cylinder equipped with a piston, and a piston rod extended from one end of the cylinder; said rod and cylinder being operatively connected, respectively, to the outer ends of said levers for the functional actuation of said jaws.

5. In a guying system for a mast or the like, cable winding means, a pulley block attached by a close coupled connection to the upper end portion of the mast, a sheave wheel mounted on the mast near the pulley block, two guy line anchoring blocks secured at points away from the mast and in laterally spaced relationship, a continuous guying cable fixed at one end to the mast and extended outwardly therefrom, about one of said anchoring blocks, thence back to the mast and through said pulley block as attached thereto, thence away from the pulley block and through the other of said anchoring blocks, thence back to the mast, over said sheave wheel and to said cable winding means, and a cable clamp associated with said pulley block and operable to grip said guying cable to prevent its free running through the block after guying tension has been placed on the cable by said cable winding means.

6. In combination with a vehicle mounting a mast thereon and a cable winding means on the vehicle; a mast guying system comprising a block including a sheave wheel that is mounted to turn on an axis in a vertical plane; said block being attached by a close coupling means to the mast for hinging action about a horizontal axis, a sheave wheel mounted at the upper end of the mast by a swivel mounting and adapted to rotate on a horizontal axis, two guy line anchoring blocks secured at points away from the mast and in laterally spaced relationship, a single guying cable extended from said cable winding means, over the last mentioned sheave wheel, thence extended to and through one of said anchoring blocks, thence extended to and about the sheave wheel of said close coupled block, thence away from the mast and about the other of said anchoring blocks, thence back to said mast and dead ended thereto, and a cable clamp close coupled to the first mentioned block and passing said guying cable therethrough and including means operable to cause said clamp to grip and hold the cable therein, thus to retain the lengths of the two guys as established between the mast and anchoring blocks.

7. The combination recited in claim 6 wherein said cable clamp is operable by power means under remote control.

References Cited in the file of this patent

UNITED STATES PATENTS

| | | |
|---|---|---|
| 1,226,405 | Swan | May 15, 1917 |
| 1,411,053 | Manges | Mar. 28, 1922 |
| 2,694,474 | Meany | Nov. 16, 1954 |
| 2,708,525 | Woleslagle | May 17, 1955 |